United States Patent
Chen

(10) Patent No.: US 6,993,370 B2
(45) Date of Patent: Jan. 31, 2006

(54) BACK CLIP FIXTURE OF A RECEIVER AND TRANSMITTER DEVICE

(75) Inventor: Kuo-Chung Chen, Taipei Hsien (TW)

(73) Assignee: Jdi Jing Deng Industrial Co., Ltd., Taipei Hsien (TW)

( * ) Notice: Subject to any disclaimer, the term of this patent is extended or adjusted under 35 U.S.C. 154(b) by 574 days.

(21) Appl. No.: 10/255,592

(22) Filed: Sep. 27, 2002

(65) Prior Publication Data

US 2004/0203492 A1 Oct. 14, 2004

(51) Int. Cl.
*H04B 1/38* (2006.01)
(52) U.S. Cl. .............................. 455/575.1; 455/575.6; 455/66.1; 379/446; 379/455; 379/454; 379/449
(58) Field of Classification Search ............. 455/575.1, 455/575.6, 66.1; 379/446, 455, 454, 449
See application file for complete search history.

(56) References Cited

U.S. PATENT DOCUMENTS

| 5,452,497 A | * | 9/1995 | Peng ............................. 24/3.11 |
| 5,806,146 A | * | 9/1998 | Chen ............................. 24/3.11 |
| 6,752,299 B2 | * | 6/2004 | Shetler et al. .............. 224/197 |

* cited by examiner

*Primary Examiner*—Nick Corsaro
*Assistant Examiner*—Sanh Phu

(57) ABSTRACT

A back clip fixture of a receiver and transmitter device assembled by a back clip and a receiver and transmitter device is characterized that a concave slot is respectively disposed at positions opposite two sides of the detachment seat for facilitating the mounting and dismounting of a joint seat piece; more especially, the lower positioning piece has a slot location for fitly assembling an upper positioning piece; furthermore, the upper positioning piece has a notch disposed thereby providing a larger space for a resilient piece to separate from a positioning slot so as to increase the detachment effect.

8 Claims, 5 Drawing Sheets

BACK CLIP FIXTURE OF A RECEIVER AND TRANSMITTER DEVICE

BACKGROUND OF THE INVENTION

1) Field of the Invention

The present invention relates to a back clip fixture of a receiver and transmitter device, more particularly, a detachable and assembled back clip fixture of a receiver and transmitter device.

2) Description of the Prior Art

FIG. 1 shows the exploded drawing of a conventional receiver and transmitter device. As indicated, the concept of the back clip fixture design of the conventional receiver and transmitter device (10) is simpler. FIG. 2 shows the exploded drawing of a part of the conventional back clip assembled by a clip board (12), a spring (14), an upper and a lower positioning pieces (18, 19), a joint seat piece (22) and a resilient piece (24); wherein, the area of the upper positioning piece (18) is small; in other words, the area of a convex point (108) disposed on the upper positioning piece (18) fits the position of a hole (104) on the lower positioning piece (19). When the receiver and transmitter device (10) holds a certain object, such as a back strap or a waist belt, through the clip board (12), the object is held between the lower positioning piece (19) and the clip board (112). Therefore, the object held and the lower positioning piece (19) easily abrade each other when the upper and lower positioning pieces (18, 19) rotate to a certain degree. A long-term and constant application might damage and crack the clip board (12) or even cause abrasion loss.

Furthermore, a detachment seat (122) and a positioning slot (120) are disposed on the main body (20) to join and position the back clip; that means, an extension rim (23) of the join seat piece (22) inserts into the detachment seat (122) and then positions into the positioning slot (120) through a positioning point (124) of the resilient piece (24) for achieving the joining and positioning objective. However, when removing the main body (20) of the receiver and transmitter device (10) for communicating information, the entire join seat piece (22) must slide outside the detachment seat (122) for detachment; in addition, the slid main body (20) has to be in a planar shape. Furthermore, the upper positioning piece (18) is in an elongate external shape; it is necessary to lift the resilient piece (24) to separate from the positioning slot (120) for removing from the detachment seat (122). However, due to the external shape design of the upper positioning piece (18), the space provided for lifting the resilient piece (24) is limited such that it is not easy to access.

SUMMARY OF THE INVENTION

In view of the abovementioned and in order to solve said problems as well as achieve the other effects and objectives, the inventor of the present inventor, also the expert of manufacturing the telecommunication devices, researched and developed a back clip fixture of a receiver and transmitter device for achieving and enhancing the effects.

The primary objective of the present invention is to provide a back clip fixture of a receiver and transmitter device easy for mounting and dismounting; opposite concave slots are disposed on a detachment seat of a main body; a join seat piece does not need to slide outside the detachment seat completely or have a planar shape; instead, the join seat piece corresponding to the detachment seat directly inserts and positions in the concave slots to achieve the objective. In addition, the external shape of the receiver and transmitter device is not limited. That solves the problems of time-consuming detachment procedure and inconvenient application of a conventional receiver and transmitter device.

The secondary objective of the present invention is to provide an upper positioning piece with a larger area to fitly assemble with a lower positioning piece. In addition to the corresponding space disposed for a convex point and a hole, the area of the upper positioning piece is enlarged such that the object to be held is not only clipped on the upper positioning piece, but also protected when rotating with the upper positioning piece. Furthermore, the upper positioning piece has a notch to make lifting the resilient piece or the object to be held become very simple and allow a larger object to be held.

Therefore, the operation of the present invention is simple and easy; the reloading onto the back clip is very convenient. Furthermore, it is applicable to various kinds of back clip structures.

To enable a further understanding of other objective, the structural features and the advantages of the present invention, the brief description of the drawings below is followed by the detailed description of the preferred embodiment.

DETAILED DESCRIPTION OF THE PREFERRED EMBODIMENTS

Figure 1:
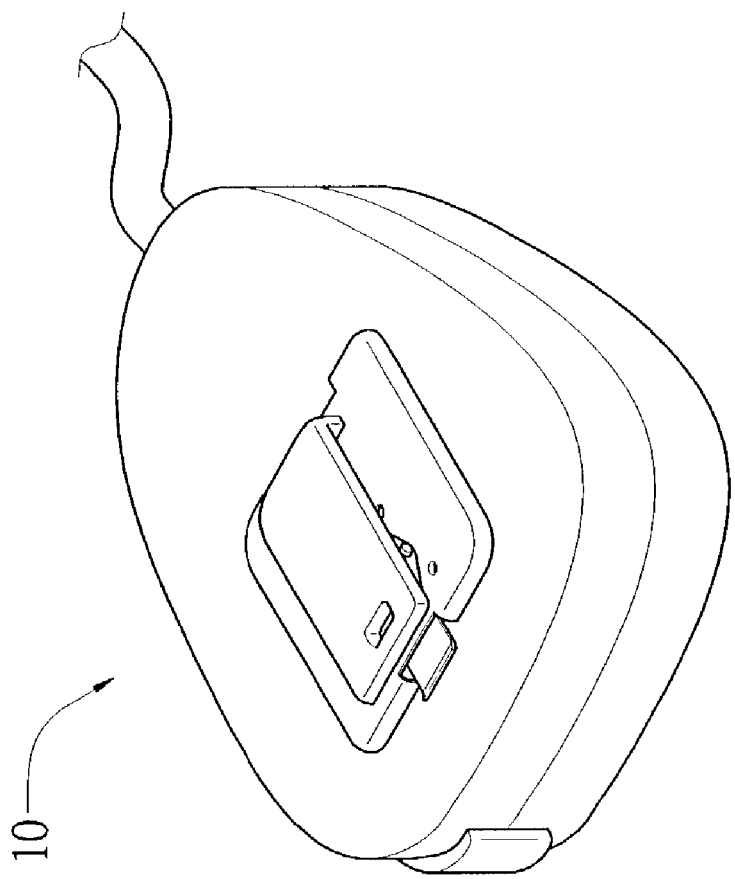
FIG. 1 is a pictorial drawing of a conventional receiver and transmitter device.
Figure 2:
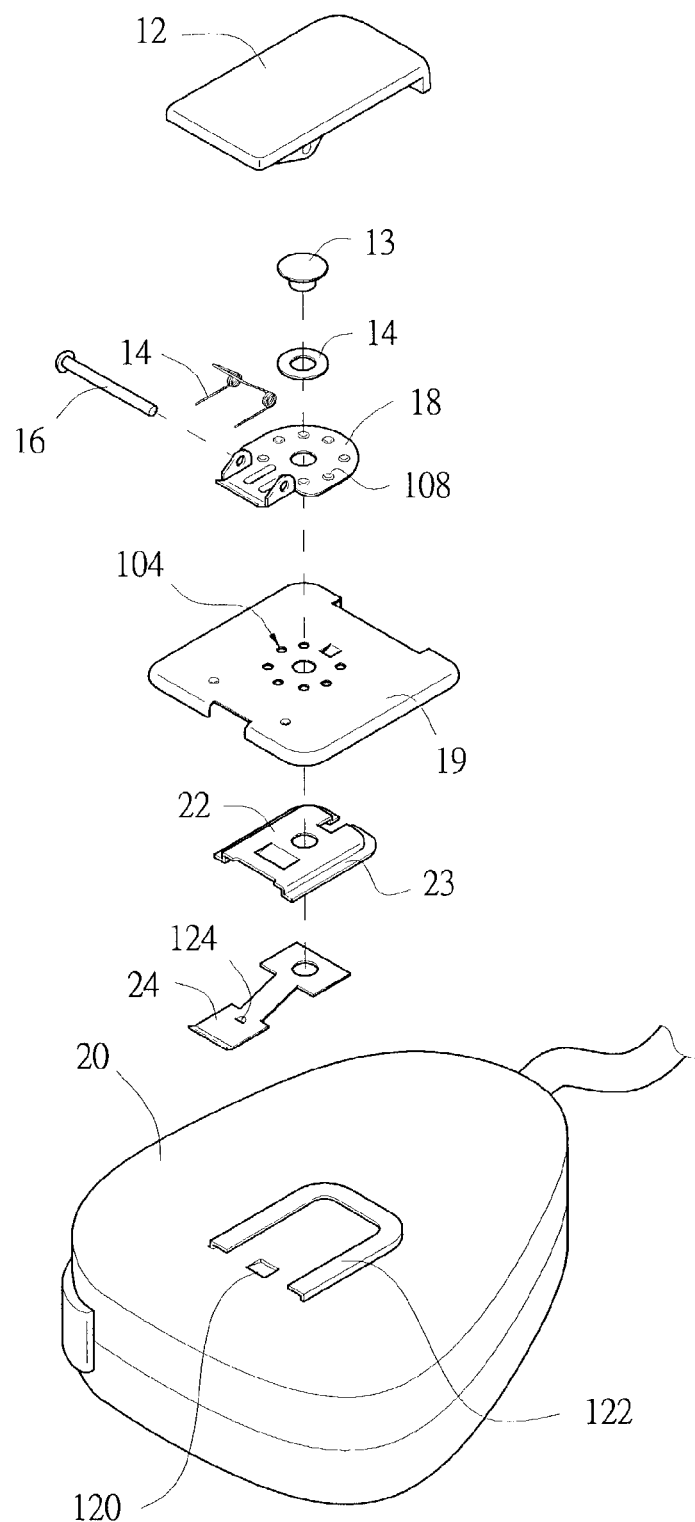
FIG. 2 is an exploded and schematic drawing of a conventional back clip.
Figure 3:
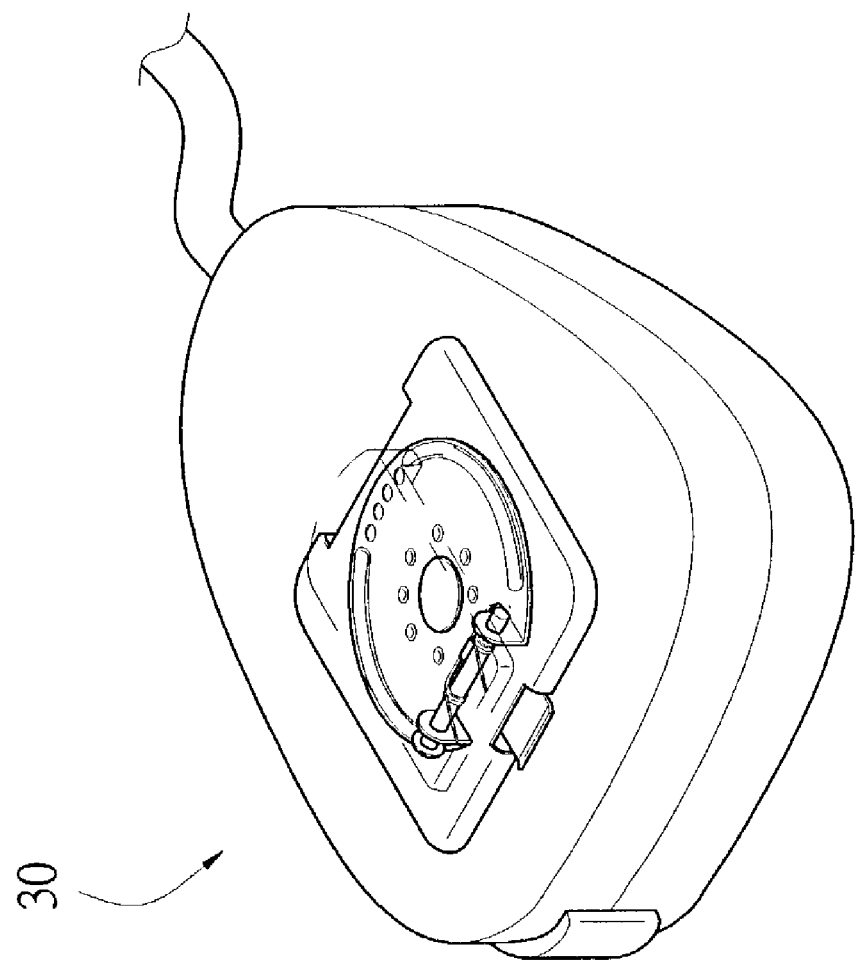
FIG. 3 is a pictorial drawing of a receiver and transmitter device of the present invention.
Figure 4:
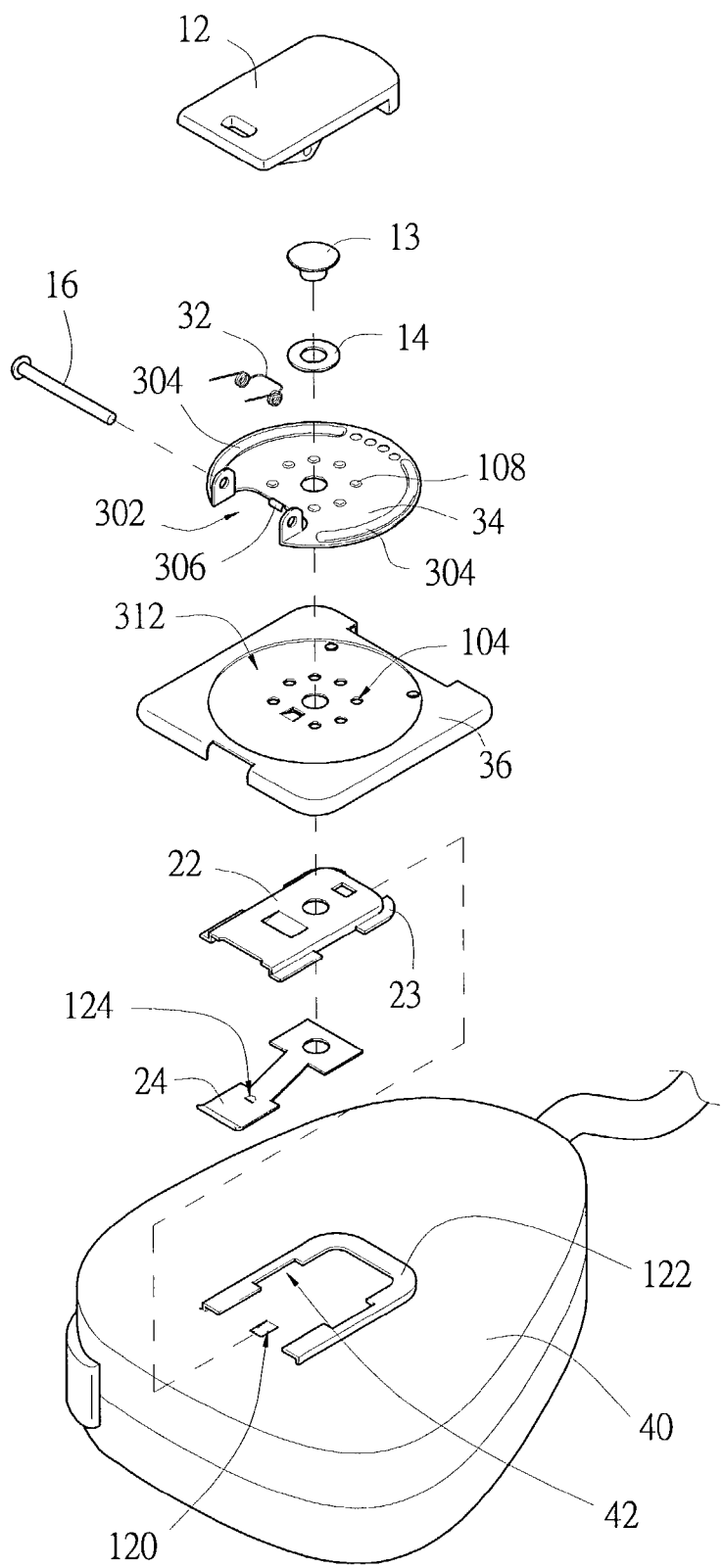
FIG. 4 is an exploded and schematic drawing of part of FIG. 3.

FIGS. 3 and 4 show the pictorial drawing as well as the partially exploded and schematic drawing of the receiver and transmitter of the present invention. The present invention of a back clip fixture of a receiver and transmitter device assembled by a back clip and a receiver and transmitter device comprises a main body (40) with at least one detachment seat (122) and a positioning slot (120); a clip board (12) joins a spring (32) to produce a clipping force; an upper and a lower positioning pieces (34, 36) are disposed with a plurality of corresponding convex points (108) and holes (104); a join seat piece (22) has a extension rim (23) with a proper length disposed on the peripheral rim thereof for connecting and positioning the detachment seat (22); a resilient piece (24) is fixed with the join seat piece (22); the front rim position of the resilient piece (24) is disposed with a positioning point (124) located opposite the positioning slot (120).

The present invention is characterized that a concave slot (42) is respectively disposed at positions opposite two sides of the detachment seat (122) for facilitating the mounting and dismounting of a joint seat piece (22); more especially, the lower positioning piece (36) has a circular slot location (312) for fitly assembling the upper positioning piece (34); furthermore, the upper positioning piece (34) has a notch (302) disposed for providing larger space for the resilient piece (24) to separate from the positioning slot (120) so as to increase the detachment effect.

Wherein, the clip board (12) is fixed to the upper positioning piece (34) through a guide post (16) and it tandems the spring (32) thereby allowing the clip board (12) to produce a resilient clipping force. The upper and lower positioning pieces (34, 36), the join seat piece (22) and the resilient piece (24) are further fixed together through a fixing body (13), such as a rivet or a nut, plus a back-up piece (15).

What has to be emphasized is that the design of the upper positioning piece (34) of the present invention has several features. In addition to the notch (302), a hook-type object (306) is also disposed at the central position to hook with the spring (32); the periphery of the upper positioning piece (34) is disposed with a convex rim (304) for increasing the strength and style thereof; furthermore, a plurality of convex points (108), opposite to the clipping position of the clip board (12) and the upper positioning piece (34), for increasing the clipping effect. In addition, the spring (32) is in a u-shape; the head end portion thereof hooks the hook type object (306) and the two end portions thereof are for exerting force; that means, the design of the resilient force exertion portion of the clip board (12) is different from that of a reverse u-shape of a conventional spring and the force is exerted at the head end portion.

Figure 5:
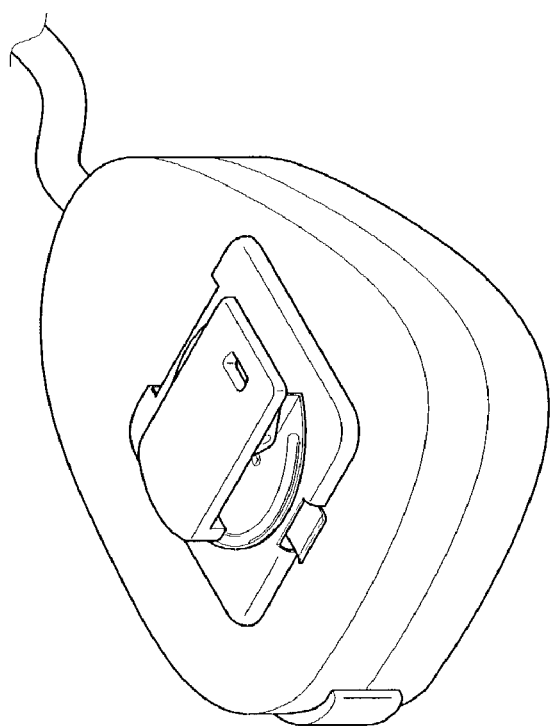
FIG. 5 is a schematic drawing of the back clip of the present invention rotating to another angle.

FIGS. 3 and 5 further clearly describe the exemplary embodiment of the present invention. The upper positioning piece (34) has a circular contour with an enlarged area and is disposed with the notch (302) to fitly correspond to the unshaped spring (32) thereby increasing the space for lifting the resilient piece (24) to separate from the positioning slot (120); in other words, it increases the convenience of taking out the receiver and transmitter device (40) as well as enlarges the expandable space of the clip board (12); therefore, the volume of the object to be clipped is also increased.

Figure 6:
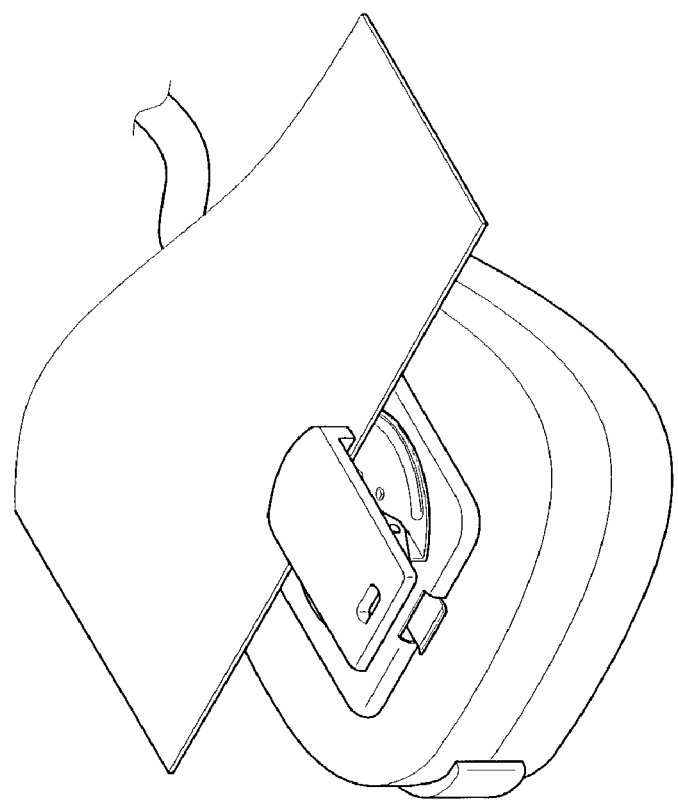
FIG. 6 is a drawing of another exemplary embodiment of the present invention.

FIG. 6 shows another exemplary embodiment of the present invention; it is a schematic drawing indicating that the receiver and transmitter device (40) of the present invention is clipping an object held (320). The primary objective of FIG. 6 is to show that the object held (320) turns and rotates along with the upper positioning piece (34) for positioning, as indicated in FIG. 5 also. Therefore, the object held (320) won't be damaged due to abrasion. Furthermore, a round hole is disposed at a proper position on the clip board (12) for easy hanging and placement.

In addition to the application onto a receiver and transmitter device, the present invention can be further applied to a mobile phone or other telecommunication equipment; the principle and structure thereof are the same as above-mentioned.

The present invention has not been previously disclosed. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A back clip fixture of a receiver and transmitter device comprises:
    a main body with at least one detachment seat and a positioning slot;
    a clip board joining a spring to produce a clipping force;
    an upper and a lower positioning pieces disposed with a plurality of corresponding convex points and holes;
    a join seat piece has a extension rim with a proper length disposed on the peripheral rim thereof for connecting and positioning the detachment seat;
    a resilient piece fixed with the join seat piece; the front rim position of the resilient piece is disposed with a positioning point located opposite the positioning slot;
    wherein a concave slot is respectively disposed at positions opposite two sides of the detachment seat for facilitating the mounting and dismounting of the joint seat piece; more especially, the lower positioning piece has a slot location for fitly assembling the upper positioning piece;
    furthermore, the upper positioning piece has a notch disposed for providing larger space for the resilient piece to separate from the positioning slot so as to increase the detachment effect.

2. The back clip fixture of The receiver and transmitter device according to claim 1, wherein a hook type object is disposed at a proper position of the notch.

3. The back clip fixture of The receiver and transmitter device according to claim 1, wherein the upper and lower positioning pieces, the join seat piece and the resilient piece are fixed together through a fixing body and a back-up piece.

4. The back clip fixture of The receiver and transmitter device according to claim 1, wherein the spring is in a u-shape with a head end portion thereof hooking the hook type object and two end portions provided for exerting force.

5. The back clip fixture of The receiver and transmitter device according to claim 1, wherein the clip board is fixed onto the upper positioning piece through a guide post and it tandems the spring.

6. The back clip fixture of The receiver and transmitter device according to claim 1, wherein the slot location is in a circular shape.

7. The back clip fixture of The receiver and transmitter device according to claim 1, wherein the receiver and transmitter device further includes a mobile phone or other telecommunication equipment to be connected with the main body for application.

8. The back clip fixture of The receiver and transmitter device according to claim 1, wherein a round hole is disposed at a proper position on the clip board.

* * * * *